United States Patent
Kim

(10) Patent No.: US 8,743,814 B2
(45) Date of Patent: Jun. 3, 2014

(54) METHOD AND APPARATUS FOR TRANSMITTING SCHEDULING REQUEST SIGNAL IN MOBILE COMMUNICATION SYSTEM

(75) Inventor: Soeng-Hun Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/499,855

(22) PCT Filed: Oct. 11, 2010

(86) PCT No.: PCT/KR2010/006950
§ 371 (c)(1),
(2), (4) Date: Apr. 2, 2012

(87) PCT Pub. No.: WO2011/043637
PCT Pub. Date: Apr. 14, 2011

(65) Prior Publication Data
US 2012/0195281 A1    Aug. 2, 2012

(30) Foreign Application Priority Data
Oct. 9, 2009    (KR) .................. 10-2009-0096484

(51) Int. Cl.
*H04W 74/02*    (2009.01)
*H04W 72/12*    (2009.01)
(52) U.S. Cl.
CPC ................... *H04W 72/1263* (2013.01)
USPC ....................................... 370/329
(58) Field of Classification Search
None
See application file for complete search history.

(56) References Cited

U.S. PATENT DOCUMENTS

| 2006/0274690 | A1 | 12/2006 | Chun et al. |
| 2008/0004058 | A1 | 1/2008 | Jeong et al. |
| 2008/0064410 | A1 | 3/2008 | Kwon et al. |
| 2009/0197610 | A1* | 8/2009 | Chun et al. ............... 455/450 |
| 2009/0201868 | A1 | 8/2009 | Chun et al. |
| 2009/0219951 | A1* | 9/2009 | Chun et al. ............... 370/474 |
| 2009/0232018 | A1 | 9/2009 | Chun et al. |
| 2009/0300457 | A1* | 12/2009 | Kuo ............................. 714/749 |
| 2010/0034158 | A1* | 2/2010 | Meylan ........................ 370/329 |
| 2010/0074231 | A1* | 3/2010 | Hsu ............................. 370/336 |
| 2010/0077100 | A1* | 3/2010 | Hsu et al. .................... 709/234 |
| 2010/0098011 | A1* | 4/2010 | Pelletier et al. ............. 370/329 |

(Continued)

FOREIGN PATENT DOCUMENTS

| CA | 2 775 952 | 4/2011 |
| JP | 2011-055464 | 3/2011 |

(Continued)

OTHER PUBLICATIONS

ETSI TS 136.321, v8.4.0, E-UTRA MAC protocol specification; published on Jan. 2009.*

(Continued)

*Primary Examiner* — Hassan Kizou
*Assistant Examiner* — Tejis Daya
(74) *Attorney, Agent, or Firm* — The Farrell Law Firm, P.C.

(57) ABSTRACT

A method and an apparatus are provided for transmitting a scheduling request signal of a terminal in a mobile communication system. If a Buffer Status Report (BSR) is triggered, it is checked whether the BSR is canceled. If the BSR is not cancelled, a Scheduling Request (SR) is triggered for requesting resources for transmitting the BSR.

16 Claims, 8 Drawing Sheets

(56) References Cited

U.S. PATENT DOCUMENTS

| | | | |
|---|---|---|---|
| 2010/0184445 A1* | 7/2010 | Tseng et al. | 455/450 |
| 2010/0202420 A1* | 8/2010 | Jersenius et al. | 370/337 |
| 2010/0254321 A1 | 10/2010 | Kim et al. | |
| 2010/0265896 A1 | 10/2010 | Park et al. | |
| 2010/0329204 A1* | 12/2010 | Guo et al. | 370/329 |
| 2011/0026625 A1* | 2/2011 | Susitaival et al. | 375/260 |
| 2011/0055387 A1 | 3/2011 | Tseng et al. | |
| 2012/0255492 A1* | 10/2012 | Wu et al. | 118/723 E |

FOREIGN PATENT DOCUMENTS

| | | |
|---|---|---|
| KR | 1020070121576 | 12/2007 |
| KR | 1020080044168 | 5/2008 |
| KR | 1020090028443 | 3/2009 |
| KR | 1020090084718 | 8/2009 |
| RU | 2 314 641 | 1/2008 |
| RU | 2007 144 701 | 6/2009 |
| WO | WO 2009/104928 | 8/2009 |

OTHER PUBLICATIONS

PCT/ISA/237 Written Opinion issued on PCT/KR2010/006950 (pp. 5).

PCT/ISA/210 Search Report issued on PCT/KR2010/006950 (pp. 2).

Ericsson et al., "Correction on SR Cancellation", R2-095343, 3GPP TSG-RAN2 Meeting #67, Aug. 24, 2009.

ASUSTeK, "Clarification on BSR Trigger", R2-095622, 3GPP TSG-RAN2 meeting #67bis, Oct. 12, 2009.

LTE; Evolved Universal Terrestrial Radio Access (E-UTRA); Medium Access Control (MAC) Protocol Specification (3GPP TS 36.321 Version 9.0.0 Release 9), ETSI TS 136 321 V9.0.0, Oct. 2009.

* cited by examiner

METHOD AND APPARATUS FOR TRANSMITTING SCHEDULING REQUEST SIGNAL IN MOBILE COMMUNICATION SYSTEM

PRIORITY

This application is a National Phase Entry of PCT International Application No. PCT/KR2010/006950, which was filed on Oct. 11, 2010, and claims priority to a Korean Patent Application filed in the Korean Intellectual Property Office on Oct. 9, 2009 and assigned Serial No. 10-2009-0096484, the entire disclosures of which are incorporated herein by reference.

BACKGROUND OF THE INVENTION

1. Field of the Invention

The present invention relates generally to scheduling in a mobile communication system, and more particularly, to a method and apparatus for transmitting a scheduling request signal by a User Equipment (UE) in a mobile communication system.

2. Description of the Related Art

Generally, mobile communication systems provide communication services while securing user mobility. Thanks to technology breakthroughs, the mobile communication systems have evolved to provide not only voice communication services, but also high-speed data communication services.

Standardization for Long Term Evolution (LTE) in $3^{rd}$ Generation Partnership Project (3GPP) is one of the next-generation mobile communication systems. LTE is a technology that can implement high-speed packet-based communication having a maximum data rate of 100 Mbps. In order to support this high-speed communication, several methods have been discussed, such as a method of reducing the number of nodes in a communication link by simplifying the network structure, and a method of approximating wireless protocols to wireless channels, if possible.

Unlike in voice service, in data service, the amount of wireless resources allocated to one UE is determined depending on the amount of transmission data and the channel conditions. Therefore, a wireless communication system, such as the mobile communication system, manages a scheduler to allocate transmission resources taking into account the amount of transmission resources, the channel conditions, and the amount of transmission data. This is performed in the same way in LTE. A scheduler located in an evolved Node B (eNB) manages wireless transmission resources and properly allocates them to UEs.

In the wireless communication system, such as the mobile communication system, data transmission is classified into downlink transmission and uplink transmission depending on the direction of data transmission. The term 'downlink transmission' refers to transmission from an eNB to a UE, while the term 'uplink transmission' refers to transmission from a UE to an eNB.

In the case of downlink transmission, since an eNB may pinpoint the current channel conditions, the amount of allocable wireless resources, and the amount of transmission data, a scheduler in the eNB may smoothly perform scheduling based on the above information. However, in the case of uplink transmission, the scheduler in the eNB may not properly allocate wireless resources to UEs since the uplink transmission may be performed without scheduler pinpointing the current buffer status of UEs, causing difficulties in the uplink transmission.

In order to solve the difficulties in the uplink transmission, in the LTE system, a UE reports its current buffer status to an eNB using a 'Buffer Status Report Control Element'.

The 'Buffer Status Report Control Element' is set to be transmitted to an eNB by a UE if certain conditions are satisfied, such as, if transmission data with a high priority is newly generated and if a predetermined timer expires.

A Buffer Status Report (BSR), occurring when new data with a high priority is generated, may be referred to as a regular BSR. In order to transmit the regular BSR to the eNB as quickly as possible, upon occurrence of a regular BSR, a UE requests transmission resources for BSR transmission by transmitting 1-bit information called Dedicated-Scheduling Request (D-SR) to the eNB. More specifically, the D-SR is used to request, from the ENB, wireless resources for transmitting a regular BSR.

SUMMARY OF THE INVENTION

The present invention has been made to address at least the above problems and/or disadvantages and to provide at least the advantages described below. Accordingly, an aspect of the present invention provides a method and apparatus for efficiently transmitting a scheduling request signal by a UE in a mobile communication system.

Another aspect of the present invention provides a method and apparatus for allowing a UE to be efficiently allocated resources for transmission of a Buffer Status Report (BSR) in a mobile communication system.

According to one aspect of the present invention, a method is provided for transmitting a scheduling request signal by a UE in a mobile communication system. If a BSR is triggered, it is checked whether the BSR is canceled. If the BSR is not canceled, a Scheduling Request (SR) is triggered for requesting resources for transmitting the BSR.

According to another aspect of the present invention, an apparatus is provided for transmitting a scheduling request by a UE in a mobile communication system. The apparatus includes a controller for, if a BSR is triggered, checking whether the BSR is canceled, and triggering an SR for requesting resources for transmitting the BSR, if the BSR is not canceled.

BRIEF DESCRIPTION OF THE DRAWINGS

The above and other aspects, features, and advantages of the present invention will become more apparent from the following detailed description when taken in conjunction with the accompanying drawings, in which.

DETAILED DESCRIPTION OF EMBODIMENTS OF THE PRESENT INVENTION

Figure 1:
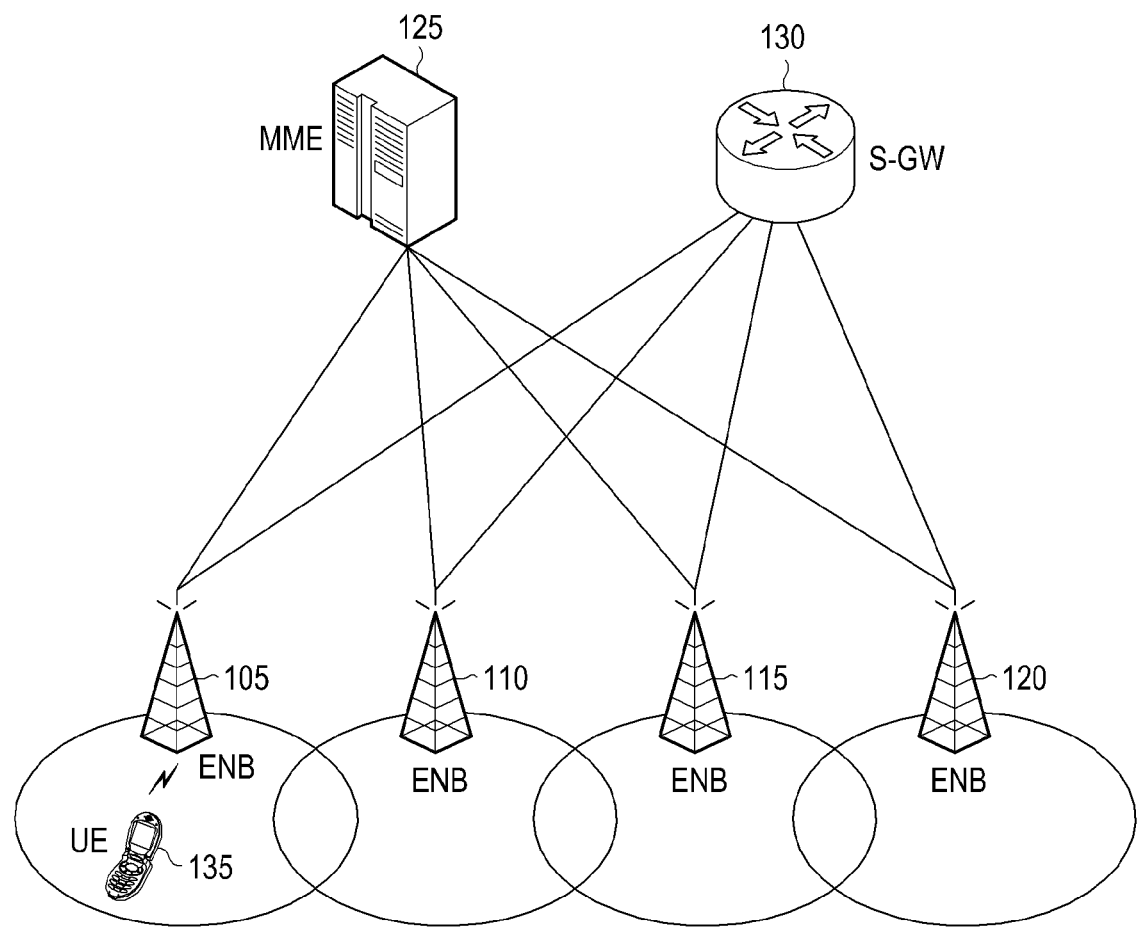
FIG. 1 is a diagram illustrating a configuration of an LTE mobile communication system.

Embodiments of the present invention are described in detail with reference to the accompanying drawings. The same or similar components may be designated by the same or similar reference numerals. Detailed descriptions of constructions or processes known in the art may be omitted to avoid obscuring the subject matter of the present invention.

Embodiments of the present invention provide a method and apparatus for preventing a UE from performing unnecessary malfunction in transmitting a D-SR.

FIG. 1 illustrates a configuration of an LTE mobile communication system.

Referring to FIG. 1, a radio access network of the LTE mobile communication system includes eNBs or Node Bs 105, 110, 115 and 120, a Mobility Management Entity (MME) 125, and a Serving-Gateway (S-GW) 130. A UE 135 accesses the network through the eNB 105 to which it is connected, and the S-GW 130.

The eNBs 105 to 120 correspond to Node Bs in the legacy UMTS system. The eNB 105 is connected to the UE 135 over a wireless channel, and plays a more complex role than the legacy Node B. LTE performs scheduling by collecting status information of UEs, since all user traffic including real time services such as Voice over Internet Protocol (VoIP) is serviced over a shared channel. This scheduling function is managed by the eNBs 105 to 120.

One eNB generally controls a plurality of cells. In order to implement a maximum data rate of 100 Mbps, LTE uses Orthogonal Frequency Division Multiplexing (OFDM) in a maximum bandwidth of 20 MHz as a wireless access technology. In addition, LTE applies Adaptive Modulation & Coding (AMC) that adaptively determines a modulation scheme and a channel coding rate depending on channel conditions of UEs.

The S-GW 130, a device for providing a data bearer, generates or removes a data bearer under control of the MME 125. The MME 125, a device responsible for various control functions for wireless connection, is connected to a plurality of eNBs.

Figure 2:
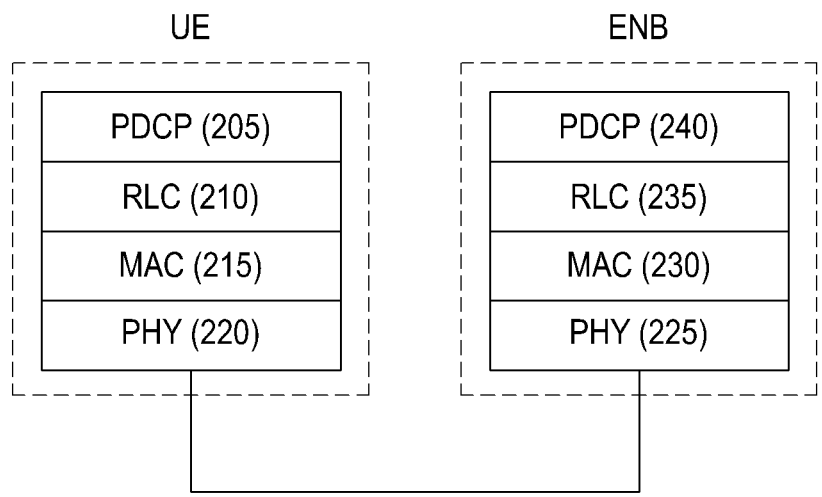
FIG. 2 is a diagram illustrating a structure of a wireless protocol in an LTE system.

FIG. 2 illustrates a structure of a wireless protocol in an LTE system.

Referring to FIG. 2, the wireless protocol of the LTE system includes Packet Data Convergence Protocol (PDCP) 205 and 240, Radio Link Control (RLC) 210 and 235, and Medium Access Control (MAC) 215 and 230. The PDCP 205 and 240 are responsible for, for example, an operation of compressing/decompressing an IP header. The RLC 210 and 235 perform an Automatic Repeat reQuest (ARQ) operation or the like by reconfiguring PDCP Packet Data Units (PDCP PDUs) into a proper size. The MAC 215 and 230 are connected to several RLC-layer devices formed in one UE, and perform an operation of multiplexing RLC PDUs to a MAC PDU, and de-multiplexing a MAC PDU into RLC PDUs. Physical (PHY) layers 220 and 225 channel-code and modulate upper layer data into OFDM symbols and transmit the OFDM symbols over a wireless channel; and/or demodulate and channel-decode OFDM symbols received over a wireless channel and transfer the decoded OFDM symbols to their upper layers.

Figure 3:
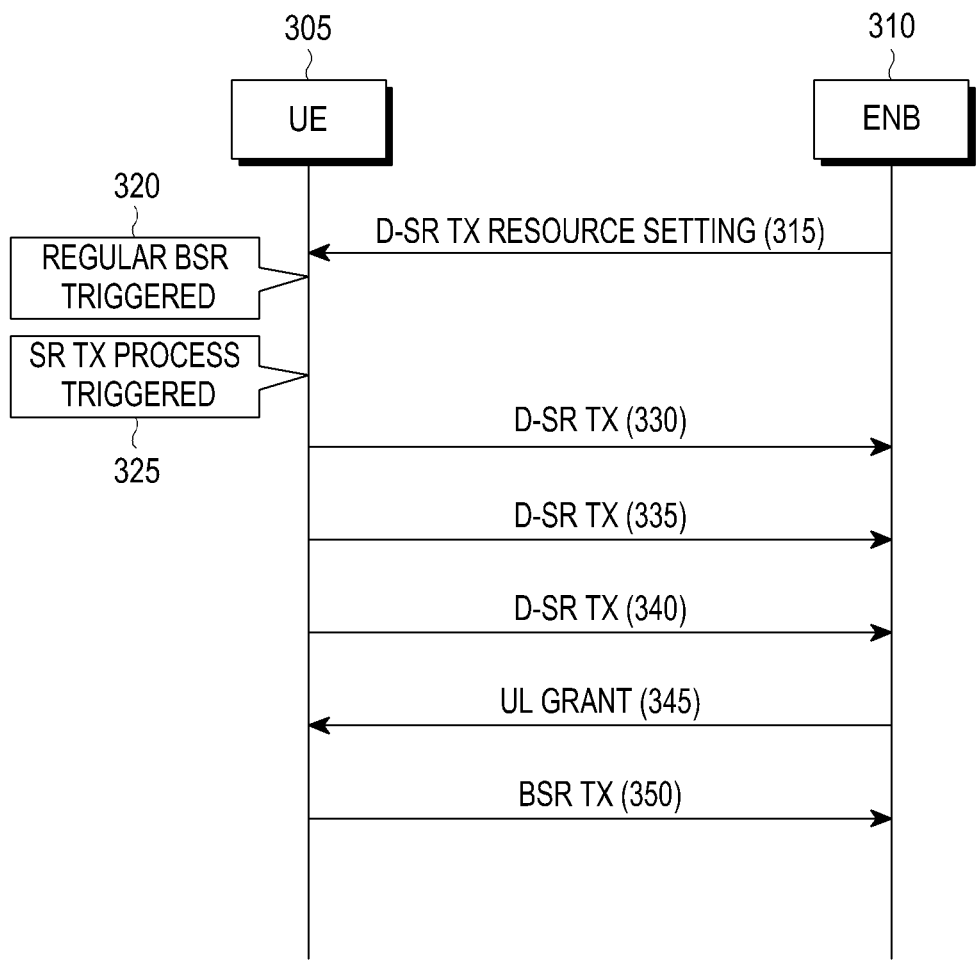
FIG. 3 is a diagram illustrating a BSR a D-SR in an LTE mobile communication system.

FIG. 3 illustrates a BSR and a D-SR in an LTE mobile communication system.

An eNB 310 may set D-SR transmission resources for a UE 305. The term 'D-SR transmission resources', as used herein, may refer to resources that an eNB allocates to a UE, allowing the UE to transmit D-SR to the eNB. The D-SR transmission resources may be allocated to the UE 305 by the eNB 310 for a predetermined period. Accordingly, in step 315, the eNB 310 sends a control message including D-SR transmission resource setting information to the UE 305. Based on the control message, the UE 305 determines the transmission resources that are set as the D-SR transmission resources for the UE 305, and the subframe having the available D-SR transmission resources.

In step 320, a particular situation is assumed, in which a regular BSR is triggered in the UE 305 at a certain time after step 315. In step 325, an SR transmission process is also triggered after the regular BSR is triggered. The term 'SR transmission process', as used herein, may refer to a process in which a UE transmits a D-SR to an eNB until it is allocated wireless resources for BSR transmission from the eNB. More specifically, if the SR transmission process is triggered, the UE 305 transmits the D-SR to the eNB 310 until the SR transmission process is canceled.

Since the UE 305 may determine a subframe allocated to its D-SR transmission resource based on the control message received in step 315, the UE 305 transmits the D-SR in the allocated subframe. The UE 305 repeatedly transmits the D-SR to the eNB 310 until it is allocated resources for BSR transmission. Assuming that the UE 305 is allocated resources for BSR transmission in step 345, the UE 305 transmits the BSR to the ENB 310 using the resources for BSR transmission in step 350.

After transmitting the BSR to the eNB 310, the UE 305 cancels the SR transmission process triggered in step 325, and no longer transmits the D-SR.

However, the eNB 310 may not receive the D-SR that the UE 305 transmitted due to, for example, an incorrectly set uplink transmission power during the D-SR transmission. In this case, the UE 305 may infinitely repeatedly transmit D-SR to the eNB 310, causing an increase in power consumption and uplink interference of the UE 305.

As a solution, the current LTE standard limits the number of UE D-SR transmissions to a predetermined threshold, dsr-transmax, or as set forth below. If a UE is not allocated resources for BSR transmission from an eNB, even after it transmitted D-SR as many times as the threshold dsr-transmax, the UE stops the D-SR transmission and starts a random access process for the BSR transmission.

When the eNB fails to receive an uplink grant even though a UE transmitted the D-SR to the eNB as many times as the threshold dsr-transmax, i.e., the UE's fails to be allocated resources for BSR transmission, it suggests a possible fatal error in setting the uplink transmission for the UE. Therefore, the UE releases dedicated uplink transmission resources including D-SR transmission resources. When the UE fails to receive an uplink grant from an eNB even though the UE transmitted the D-SR to the ENB as many times as the threshold dsr-transmax, it is referred to herein as 'D-SR transmission failure'.

In order to determine whether the D-SR transmission has failed, the UE operates a predetermined counter in which a parameter SR_COUNTER is set. A value of SR_COUNTER is initialized to 0 if SR is triggered, and increases by 1 whenever the D-SR is transmitted. If SR_COUNTER arrives at the threshold dsr-transmax for the D-SR transmission, the UE releases the dedicated uplink transmission resources including the D-SR transmission resources, and performs a random access process, determining that D-SR transmission failure has occurred. A series of operations for releasing the dedicated uplink transmission resources, including the D-SR transmission resources, and starting a random access process, is referred to herein as 'D-SR transmission failure follow-up procedure'.

In the current LTE standard, after transmitting a (dsr-transmax)-th D-SR, a UE immediately performs the D-SR transmission failure follow-up procedure without determining whether an uplink grant is received. Specifically, after transmitting the last D-SR, the UE performs the D-SR transmission failure follow-up procedure before the ENB receives the last D-SR and allocates an uplink grant. As a result, the UE performs the D-SR transmission failure follow-up procedure without checking an uplink grant from the ENB for the transmitted last D-SR, so the transmission of the last D-SR may cause an unnecessary waste of resources, an increase in uplink interference, and power dissipation of the UE. These problems are described in greater detail below, with reference to FIG. 4.

Figure 4:
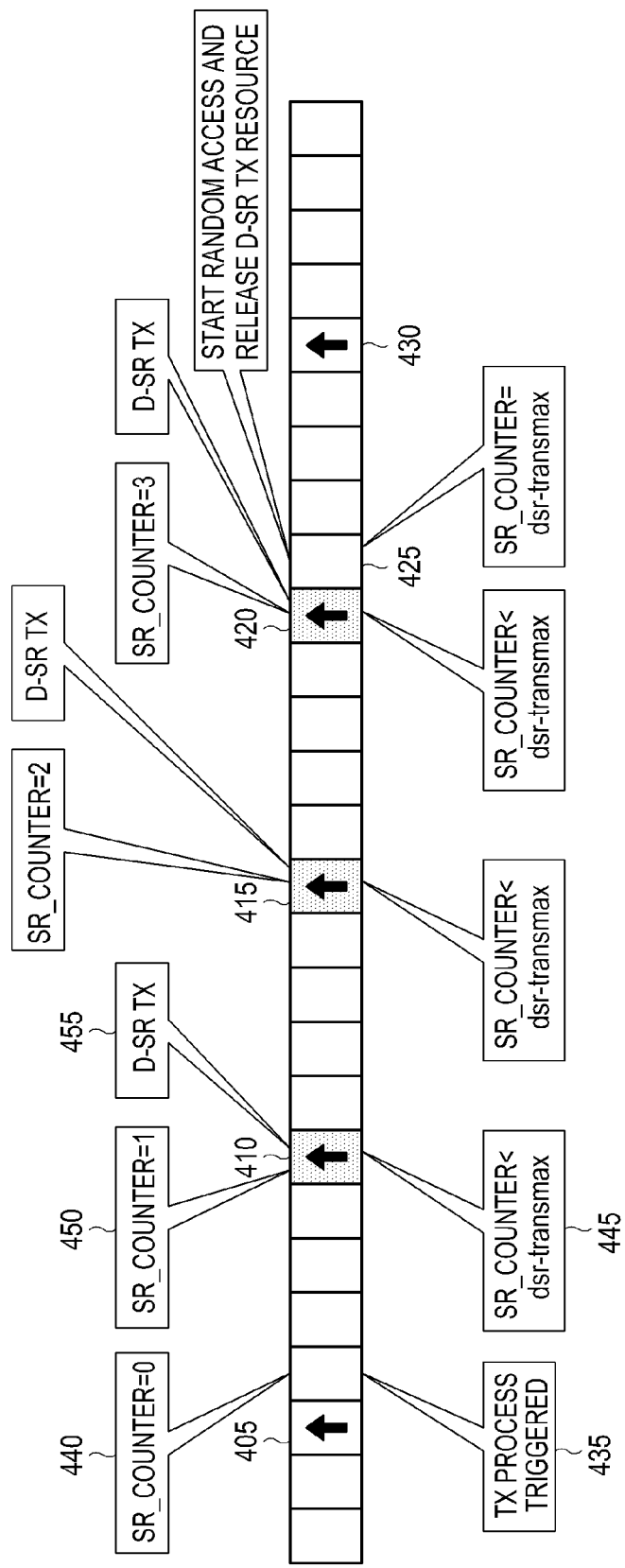
FIG. 4 is a diagram illustrating problems of the conventional technology related to an embodiment of the present invention.

FIG. 4 illustrates problems of the conventional technology related to an embodiment of the present invention.

In FIG. 4, one rectangle represents a 1-msec subframe. Subframes for the D-SR transmission resources, which are allocated to a UE, are shown by arrows 405, 410, 415, 420, and 430.

It is assumed that an SR transmission process is triggered in a UE at an arbitrary time, as shown by reference numeral 435. If the SR transmission process is triggered in step 435, the UE initializes SR_COUNTER to 0 in step 440, and waits until a subframe allocated for available D-SR transmission resources.

In step 445, the UE compares SR_COUNTER with the maximum allowable number dsr-transmax of D-SR transmissions in order to determine whether to perform the D-SR transmission in the subframe 410, which allocated to be available as D-SR transmission resources. If SR_COUNTER is less than dsr-transmax as a result of the comparison, i.e., if the number of SR transmissions has not arrived at the maximum allowable number of D-SR transmissions, the UE increases SR_COUNTER by 1 in step 450, and transmits the D-SR in step 455.

If the SR transmission process is in progress, the UE repeats an operation of comparing SR_COUNTER with dsr-transmax in every subframe where D-SR transmission resources are available, and if SR_COUNTER is less than dsr-transmax, increasing SR_COUNTER by 1 and transmitting the D-SR. For example, if dsr-transmax is set to 3, the UE transmits SR and increases SR_COUNTER by 1 in a subframe 420 because SR_COUNTER at the time is 2.

In the next subframe 425, since SR_COUNTER is 3 and a value of SR_COUNTER is equal to dsr-transmax at this time, the UE performs the D-SR transmission failure follow-up procedure. Specifically, the UE releases the D-SR transmission resources and performs random access for resources for BSR transmission, if SR_COUNTER is greater than or equal to dsr-transmax. More specifically, the UE performs the D-SR transmission failure follow-up procedure before the ENB responds to the SR that the UE transmitted in the subframe 420.

This problem occurs because the UE immediately performs the D-SR transmission failure follow-up procedure in the next subframe after it transmitted the last D-SR in an operation of the above-described conventional LTE standard. However, it is preferable that after transmitting D-SR, a UE waits for a response thereto from an eNB, i.e., waits for an uplink grant to be received, for a predetermined period of time.

An embodiment of the present invention solves the problems described with respect to FIG. 4. Conventionally, after transmitting D-SR, a UE increases SR_COUNTER, compares SR_COUNTER with dsr-transmax, and immediately performs the D-SR transmission failure follow-up procedure if SR_COUNTER is greater than or equal to dsr-transmax.

However, in an embodiment of the present invention, unlike in the convention method, a UE increases SR_COUNTER in advance at a predetermined time ahead of the transmission time of the D-SR. Thereafter, the UE compares SR_COUNTER with dsr-transmax, and performs the D-SR transmission failure follow-up procedure if SR_COUNTER is greater than dsr-transmax as a result of the comparison. In this way, the embodiment of the present invention may solve the above-described problems by changing the start time of the D-SR transmission failure follow-up procedure.

In accordance with an embodiment of the present invention, a UE transmits the D-SR but does not start the D-SR transmission failure follow-up procedure at the time the SR_COUNTER value is equal to the dsr-transmax value. In addition, the UE increases SR_COUNTER by 1 at a predetermined time ahead of the next subframe available for D-SR transmission resources, satisfying a condition that SR_COUNTER is greater than dsr-transmax. Thus, the UE may perform the D-SR transmission failure follow-up procedure without transmitting the D-SR.

As a result, instead of immediately performing the D-SR transmission failure follow-up procedure after transmitting the last D-SR, the UE determines whether to perform the D-SR transmission failure follow-up procedure after waiting until the next subframe available for D-SR transmission resources, preventing unnecessary transmission of the D-SR.

Figure 5:
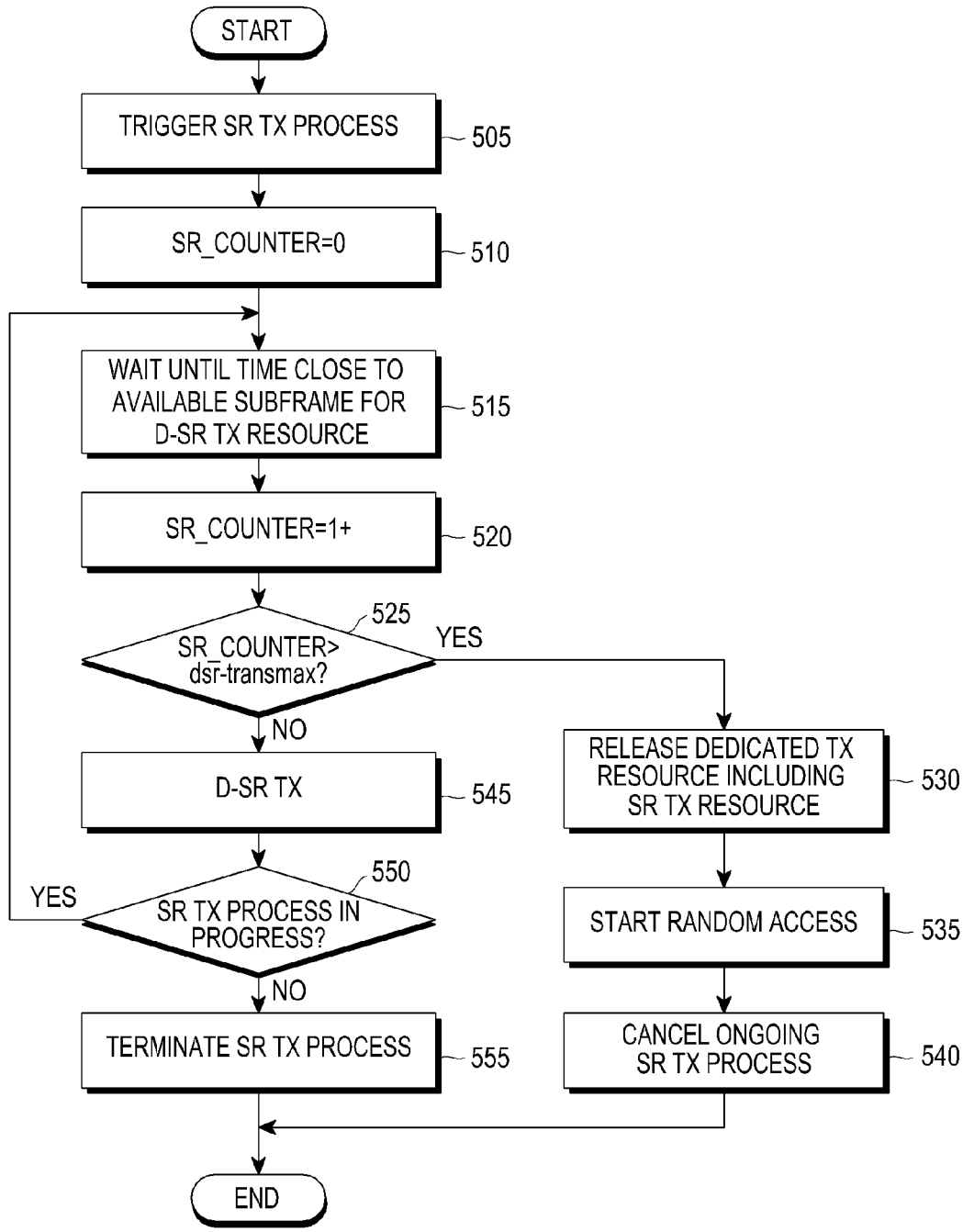
FIG. 5 is a diagram illustrating the transmission of a scheduling request signal in a UE, according to an embodiment of the present invention.

FIG. 5 illustrates an operation of transmitting a scheduling request signal in a UE, according to an embodiment of the present invention.

An SR transmission process is triggered due to occurrence of, for example, a regular BSR, in step 505. The UE initializes SR_COUNTER to 0, in step 510. In step 515, the UE awaits until a predetermined time close to a subframe available for D-SR transmission resources in order to determine whether to transmit the D-SR. The predetermined time may be set as a time ahead of a subframe available for D-SR transmission resources by a UE's processing delay required to determine whether to transmit SR, or whether to perform the D-SR transmission failure follow-up procedure. This time is subject to change.

In step 520, the UE increases SR_COUNTER by 1 prior to a process of determining whether to transmit the D-SR. By increasing SR_COUNTER in advance, prior to determining whether to transmit D-SR and whether to perform the D-SR transmission failure follow-up procedure as described above, the UE does not unnecessarily transmit the D-SR before performing the D-SR transmission failure follow-up procedure.

For example, in FIG. 4, the UE updates SR_COUNTER to 4 and compares SR_COUNTER with dsr-transmax at a predetermined time, which precedes the subframe 430 and is close to the subframe 430. The UE performs the follow-up operation in the subframe 430 because SR_COUNTER is greater than dsr-transmax. Specifically, instead of immediately performing the follow-up operation after transmitting the last D-SR, the UE performs the follow-up operation after waiting until the subframe time available for D-SR transmission resources.

In step 525, the UE compares SR_COUNTER with dsr-transmax. If SR_COUNTER is less than or equal to dsr-transmax, the UE proceeds to step 545 for D-SR transmission. If SR_COUNTER is greater than dsr-transmax, the UE proceeds to step 530 for D-SR transmission failure follow-up procedure.

Conventionally, the UE performs the operation of step 530 if SR_COUNTER is greater than or equal to dsr-transmax. However, in an embodiment of the present invention, the UE proceeds to step 530 if SR_COUNTER is greater than dsr-transmax. If dsr-transmax is set to a value which is greater by 1 than the conventional technology, the conventional determination procedure may be used. Specifically, in this case, if SR_COUNTER is less than dsr-transmax in step 525, the UE proceeds to step 545. If SR_COUNTER is equal to or greater than dsr-transmax, the UE may proceeds to step 530. In this case, however, the UE should set dsr-transmax to a value which is greater by 1 than the conventional method, because (dsr-transmax−1)-th D-SR transmission is the last D-SR transmission.

Proceeding to step 530 means that even though the UE has performed D-SR transmission a predetermined maximum number of D-SR transmissions, the UE has failed to receive a response thereto, i.e., an uplink grant. Thus, the UE performs the D-SR transmission failure follow-up procedure. The UE releases various dedicated uplink transmission resources including D-SR transmission resources in step 530, starts a random access process in step 535, and cancels the entire ongoing SR transmission process in step 540.

Proceeding to step 545 means that the number of D-SR transmissions has not reached a predetermined maximum number of D-SR transmissions, so the UE transmits the D-SR. In step 550, the UE checks whether the SR transmission process is in progress. When the SR transmission process is in progress, the SR transmission process has not been canceled after being triggered. The SR transmission process may be canceled by the D-SR transmission failure follow-up procedure, as in step 540, and may be canceled when a regular BSR is transmitted.

If the SR transmission process is still in progress, the UE returns to step 515 and continues to perform the SR transmission process. However, if the SR transmission process is not in progress, i.e., if the SR transmission process has been canceled when the BSR is transmitted after the SR transmission process was triggered, the UE terminates the SR transmission process in step 555.

Figure 6:
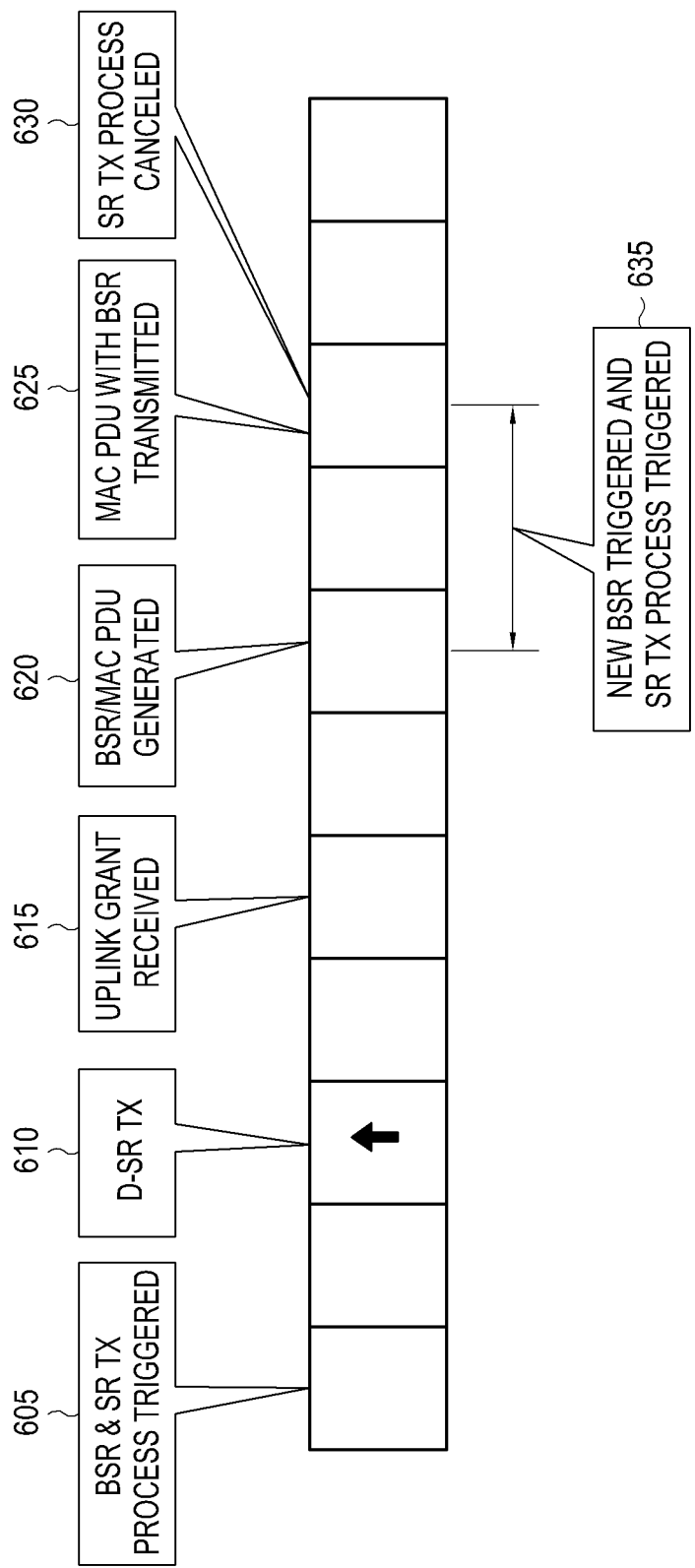
FIG. 6 is a diagram illustrating problems of the conventional technology related to an embodiment of the present invention, and the transmission of a scheduling request signal in a UE, according to an embodiment of the present invention.

FIG. 6 is a diagram illustrating a process of transmitting a scheduling request signal in a UE, according to an embodiment of the present invention.

FIG. 6 illustrates problems of the conventional technology related to an embodiment of the present invention, and a process of transmitting a scheduling request signal in a UE, according to an embodiment of the present invention.

As described above, if a regular BSR is triggered, an SR transmission process is also triggered in order for the UE to be allocated resources for transmission of the regular BSR. However, exceptional situations may occur, in which, even though a regular BSR is triggered, the D-SR is not transmitted.

For example, when a regular BSR is triggered and an SR transmission process is triggered at an arbitrary time in step 605, and the D-SR is transmitted in a subframe available for D-SR transmission resources in step 610, if the D-SR has been successfully transmitted and received, the UE receives an uplink grant in an arbitrary subframe in step 615. In step 625, the UE performs uplink transmission 4 subframes after the subframe where the uplink grant was received.

Upon receiving the uplink grant, the UE generates a MAC PDU to be subject to uplink transmission, and the MAC PDU includes the BSR. It is assumed that a new regular BSR is generated in step 635, between a time 620 where the generation of MAC PDU is completed and a time of step 625 where the generated MAC PDU is actually transmitted.

The new regular BSR may not be included in the MAC PDU transmitted at the time of step 625. However, if the MAC PDU with the BSR is transmitted at the time of step 625, the SR transmission process triggered in step 605 is canceled at a time of step 630. The SR transmission process for the regular BSR newly generated in step 635 may be canceled without the start of the D-SR transmission.

To solve the above problems, the current LTE standard provides that the existing SR transmission process is canceled only when BSR reflecting the latest buffer status is transmitted. This solution allows the UE to access an eNB with the SR transmission process for the regular BSR newly generated in step 635, without canceling the SR transmission process triggered in step 605 for the previous BSR in the situation described in conjunction with FIG. 6. Therefore, the SR_COUNTER used in the SR transmission process for the previous BSR in step 605 is used as is, with the SR_COUNTER value not initialized. This may cause too early execution of the D-SR transmission failure follow-up procedure because of a reduction in the maximum allowable number of D-SR transmissions for a new BSR, in step 635.

In order to solve this problem, in an embodiment of the present invention, the UE cancels the current ongoing SR transmission process (i.e., SR transmission process of step 605 in FIG. 6) at a moment that MAC PDU containing BSR is transmitted, and triggers a new SR transmission process if there is no current ongoing SR transmission process, even though a new regular BSR was triggered.

For example, the UE cancels the ongoing SR transmission process at the time of step 630, if it transmits the MAC PDU containing the BSR. The UE triggers a new SR transmission process, if there is no current ongoing SR transmission process even though there is the BSR (i.e., the BSR in step 635), which is not canceled at the time of step 630. Specifically, in step 635, the UE newly triggers an SR transmission process for transmission of a newly generated regular BSR after canceling the existing SR transmission process of step 630.

Figure 7:
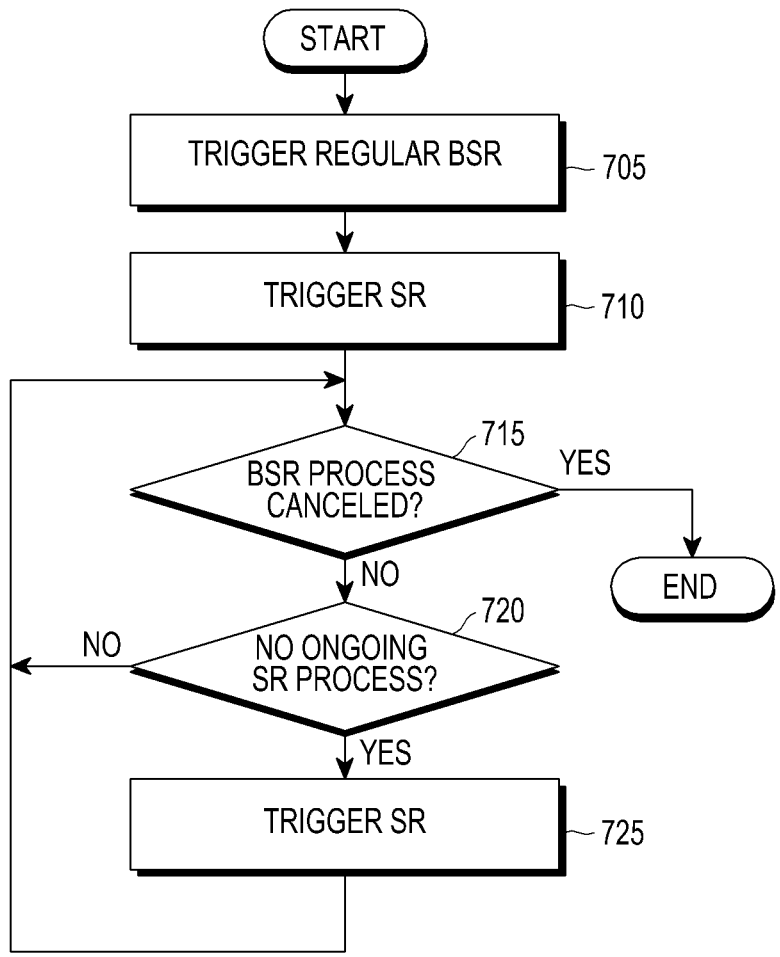
FIG. 7 is a diagram illustrating the transmission of a scheduling request signal in a UE, according to an embodiment of the present invention.

FIG. 7 illustrates an operation of transmitting a scheduling request signal in a UE, according to an embodiment of the present invention.

A regular BSR is triggered in step 705. The UE triggers an SR transmission process, in step 710. Specifically, the UE transmits the D-SR at a time when SR transmission resources are available. Upon receiving an uplink grant, the UE generates and transmits the MAC PDU including the BSR. Upon failure to receive an uplink grant, the UE performs an operation such as transmitting the D-SR.

While performing the operation, the UE determines whether the triggered BSR is canceled, in step 715. For example, the UE may monitor whether the triggered BSR is not canceled, in every Transmission Time Interval (TTI). After the BSR is triggered, if the BSR, in which the latest buffer status is reflected, is included in the MAC PDU (to be transmitted), the triggered BSR process is terminated. If the triggered BSR is canceled, the UE terminates the operation.

On the other hand, if the triggered BSR is not canceled, the UE determines whether there is a current ongoing SR transmission process, in step 720. For reference, the triggered BSR process is not canceled, if the BSR, in which the latest buffer status is reflected, is not included in MAC PDU yet, or if BSR does not reflect the current buffer status of the UE even though the BSR is included in MAC PDU.

In the general case, if there is a non-canceled BSR, an ongoing SR transmission process should also exist. However, if an SR transmission process is canceled while the BSR, in which the previous buffer status is reflected, is transmitted, as in the operation of steps 625 and 630, there may be no ongoing SR transmission process even though there is a non-canceled BSR.

Therefore, if there is a current ongoing SR transmission process, the UE returns to step 715 and continuously monitors whether the BSR process is canceled while continuing to perform the SR transmission process. However, if there is no current ongoing SR transmission process, the UE triggers a new SR transmission process in step 725. Thereafter, the UE returns to step 715 and monitors whether the BSR is canceled. If the BSR is canceled in step 715, the UE terminates the operation.

Figure 8:
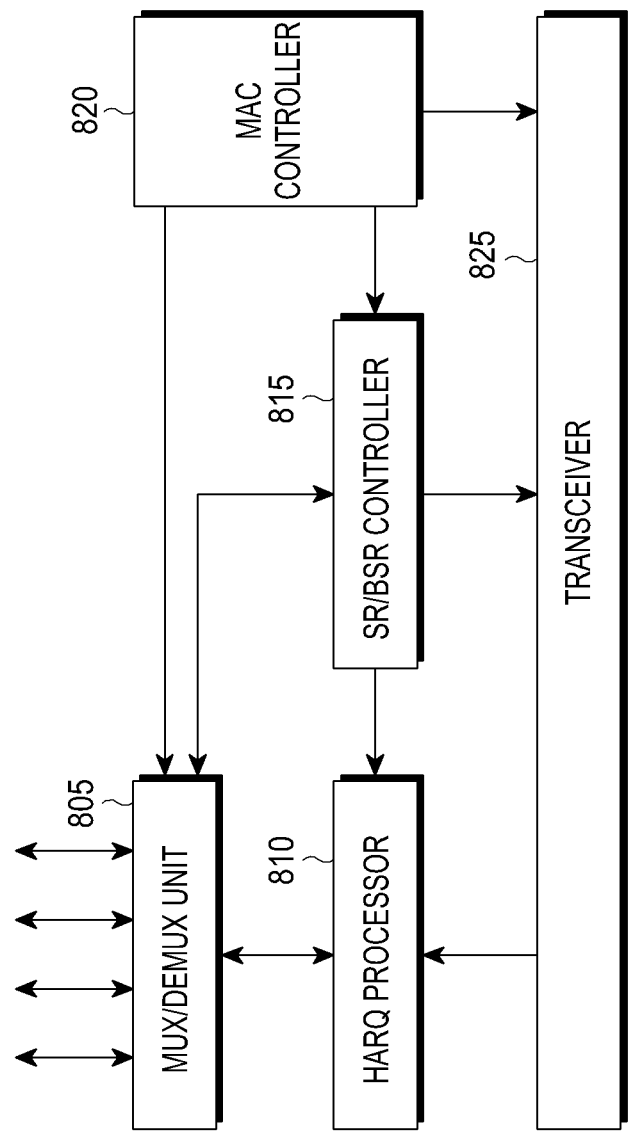
FIG. 8 is a block diagram illustrating a UE, according to an embodiment of the present invention.

FIG. 8 is a block diagram of a UE, according to an embodiment of the present invention.

It should be noted that in the UE's block diagram of FIG. 8, its upper layer device is not shown.

Referring to FIG. 8, the UE includes a multiplexing/demultiplexing (MUX/DEMUX) unit 805, an HARQ processor 810, an SR/BSR controller 815, a MAC controller 820, and a transceiver 825.

The SR/BSR controller 815 determines whether the BSR is triggered by monitoring the occurrence of upper layer data. In accordance with an embodiment of the present invention illustrated in FIG. 5, if the BSR is triggered, the SR/BSR controller 815 triggers an SR transmission process, determines whether to transmit the D-SR and whether to perform the D-SR transmission failure follow-up procedure by operating SR_COUNTER and dsr-transmax, and controls the transceiver 825 to transmit D-SR or perform a random access operation based on the determination results. In accordance with an embodiment of the present invention illustrated in FIG. 7, the SR/BSR controller 815 determines whether the BSR is canceled, and triggers a new SR transmission process if there is no ongoing SR transmission process even though there is a non-canceled BSR.

The MAC controller 820 analyzes scheduling information received over downlink and uplink control channels, and controls the transceiver 825 to receive downlink data or transmit uplink data.

The MAC controller 820 controls the MUX/DEMUX unit 805 to generate uplink transmission data. Upon receiving an uplink grant, the MAC controller 820 notifies the SR/BSR controller 815 of the receipt of the uplink grant so that the SR/BSR controller 815 may determine whether an SR transmission process is canceled and whether the BSR is canceled.

The transceiver 825 is a device for transmitting/receiving the MAC PDUs or control information, and HARQ packets over wireless channels. The HARQ processor 810 is a set of soft buffers configured to perform an HARQ operation, and is identified with an HARQ process identifier.

The MUX/DEMUX unit 805 configures MAC PDUs by concatenating data carried on a plurality of logical channels, or demultiplexes MAC PDUs into MAC SDUs and delivers them over a proper logical channel.

While the invention has been shown and described with reference to certain embodiments thereof, it will be understood by those skilled in the art that various changes in form and detail may be made therein without departing from the spirit and scope of the invention as defined by the appended claims.

The invention claimed is:

1. A method for transmitting a Scheduling Request (SR) by a User Equipment (UE) in a mobile communication system, comprising the steps of:
   receiving information regarding an SR transmission resource;
   checking whether at least one Buffer Status Report (BSR) is triggered and canceled; and
   triggering an SR based on at least a condition that the least one BSR is triggered and not canceled,
   wherein if the SR is triggered and there is no other SR pending, a counter for SR transmission is set to 0.

2. The method of claim 1, wherein checking whether the BSR is canceled is performed in every Transmission Time Interval (TTI).

3. The method of claim 1, further comprising:
   checking whether the at least one BSR is a regular BSR; and
   triggering the SR based on at least the condition that the least one BSR is triggered and not canceled, and the at least one BSR is a regular BSR.

4. The method of claim 3, wherein the regular BSR is triggered if data becomes available for transmission with high priority.

5. The method of claim 1, wherein the triggered SR is canceled based on at least a condition that a Medium Access Control Packet Data Unit (MAC PDU) including the at least one BSR is assembled.

6. The method of claim 1, wherein a random access procedure is initiated if a number of SR transmissions that arrive corresponds to a max number of SR transmissions.

7. The method of claim 1, wherein the SR is canceled when a random access procedure is initiated.

8. The method of claim 1, wherein at least one uplink grant is cleared if a number of SR transmissions that arrive corresponds to a max number of SR transmissions.

9. An apparatus for transmitting a Scheduling Request (SR) by a User Equipment (UE) in a mobile communication system, comprising:
   a receiver for receiving information regarding an SR transmission resource; and
   a controller for checking whether at least one Buffer Status Report (BSR) is triggered and canceled, and triggering a Scheduling Request (SR) based on at least a condition that the at least one BSR is triggered and not canceled,
   wherein if the SR is triggered and there is no other SR pending, a counter for SR transmission is set to 0.

10. The apparatus of claim 9, wherein the controller checks whether the BSR is canceled, in every Transmission Time Interval (TTI).

11. The apparatus of claim 9, wherein the controller checks whether the at least one BSR is a regular BSR and triggers the SR based on at least the condition that the least one BSR is triggered and not canceled, and the at least one BSR is a regular BSR.

12. The apparatus of claim 11, wherein the controller triggers the regular BSR if data becomes available for transmission with high priority.

13. The apparatus of claim 9, wherein the controller cancels the triggered SR based on at least a condition that a Medium Access Control Packet Data Unit (MAC PDU) including the at least one BSR is assembled.

14. The apparatus of claim 9, wherein the controller initiates a random access procedure if a number of SR transmissions that arrive corresponds to a max number of SR transmissions.

15. The apparatus of claim 9, wherein the controller cancels the SR when a random access procedure is initiated.

16. The apparatus of claim 9, wherein the controller clears at least one uplink grant if a number of SR transmissions that arrive corresponds to a max number of SR transmissions.

* * * * *